United States Patent
Nakamura

(10) Patent No.: US 6,235,191 B1
(45) Date of Patent: May 22, 2001

(54) WATER PURIFYING APPARATUS CAPABLE OF RELIABLY PREVENTING GROWTH OF BACTERIA DURING SUSPENSION OF WATER SUPPLY BY EFFICIENTLY ACTIVATING A STERILIZATION UNIT

(75) Inventor: Makoto Nakamura, Takasaki (JP)

(73) Assignee: Sanden Corp. (JP)

( * ) Notice: Subject to any disclaimer, the term of this patent is extended or adjusted under 35 U.S.C. 154(b) by 0 days.

(21) Appl. No.: 09/320,284

(22) Filed: Jun. 2, 1999

(30) Foreign Application Priority Data

Jun. 2, 1998 (JP) .................................................. 10-152877

(51) Int. Cl.$^7$ .................................................. B01D 17/12
(52) U.S. Cl. ................................ 210/85; 210/87; 210/97; 210/138; 210/149; 210/192; 210/195.1; 422/186.3
(58) Field of Search ................................ 210/87, 97, 103, 210/143, 149, 192, 194, 195.1, 257.1, 259, 742, 748, 138, 257.2, 85; 422/24, 186.3; 250/435, 436; 222/189.06

(56) References Cited

U.S. PATENT DOCUMENTS

| | | | | |
|---|---|---|---|---|
| 4,400,270 | * | 8/1983 | Hillman | 210/149 |
| 4,969,991 | * | 11/1990 | Valadez | 210/138 |
| 5,628,895 | * | 5/1997 | Zucholl | 210/192 |
| 5,817,231 | * | 10/1998 | Souza | 210/138 |

* cited by examiner

Primary Examiner—Joseph W. Drodge
(74) Attorney, Agent, or Firm—Banner & Witcoff, Ltd.

(57) ABSTRACT

In a water purifying apparatus having a filter for filtering raw water to produce filtered water, a sterilization unit irradiates the filtered water with ultraviolet rays to produce treated water. A recirculating arrangement is capable of recirculating the treated water through the sterilization unit. It is preferable that a water supply sensor detects supply of the treated water out of the water purifying apparatus to produce a supply detection signal and operation of the receirculating arrangement is controlled in response to presence and absence of the supply detection signal.

8 Claims, 11 Drawing Sheets

WATER PURIFYING APPARATUS CAPABLE OF RELIABLY PREVENTING GROWTH OF BACTERIA DURING SUSPENSION OF WATER SUPPLY BY EFFICIENTLY ACTIVATING A STERILIZATION UNIT

BACKGROUND OF THE INVENTION

This invention relates to a water purifying apparatus for purifying tap water supplied to a detached house or an apartment house.

A water purifying apparatus for drinking water generally comprises an adsorber such as activated carbon and/or a filter selected from various types of filtering media and serves to remove various pollutants, such as suspended solids, Protozoa, chlorine odor, musty odor, and organic compounds, remaining in tap water. If the water purifying apparatus is installed in an apartment house requiring a large amount of treated water, use is generally made of a large-scale filtering medium, magnetic effect, far-infrared ceramics, and natural stones. The size of the water purifying apparatus widely differs depending upon the amount of treated water required in each application.

In the water purifying apparatus, the tap water is made to pass through the activated carbon or the filter to remove the pollutants. Thus, the tap water is treated into the treated water. While the treated water is reserved in the water purifying apparatus before it is supplied as the drinking water, various bacteria or microorganisms may possibly grow and propagate, particularly around the activated carbon or the filter where the pollutants are adsorbed or trapped. In order to kill or destroy the bacteria and the microorganisms, heating or ultraviolet radiation is typically used.

However, if the large-scale filtering medium is used, the water purifying apparatus is increased in size and complicated in structure. Thus, the use of the additional filtering medium is disadvantageous in view of the cost and the maintenance. In addition, flow resistance is great and blinding often occurs to deteriorate the filtering ability.

On the other hand, use of an ultraviolet radiator comprising a plurality of ultraviolet lamps is also disadvantageous in the following respect. Generally, the ultraviolet lamps have a short life as a guaranteed cumulative use period. In other words, the ultraviolet lamps will be burned out after a relatively short period of use. If some of the lamps are burned out and the water purifying apparatus is kept operated, the sterilizability is degraded. In order to avoid this, the ultraviolet lamps must be frequently exchanged. Thus, the use of the ultraviolet radiator has a difficulty in maintenance. Even if either the additional filtering medium or the ultraviolet radiator is used, the growth of bacteria and microorganisms in the water purifying apparatus is inevitable if the treated water is less frequently used or is not used for a long time.

SUMMARY OF THE INVENTION

It is therefore an object of the present invention to provide a water purifying apparatus which is capable of preventing degradation in sterilizability and which is easy in maintenance.

It is another object of the present invention to provide a water purifying apparatus which is capable of avoiding the growth of bacteria and microorganisms within the apparatus even if treated water is less frequently used or is not used for a long time.

Other objects of the present invention will become clear as the description proceeds.

According to an aspect of the present invention, there is provided a water purifying apparatus which comprises a purification unit including a filter for filtering raw water to produce filtered water, a sterilization unit connected to the purification unit and supplied with the filtered water for irradiating the filtered water with ultraviolet rays to produce treated water which has been filtered and sterilized, and a recirculating arrangement connected to the sterilization unit for recirculating the treated water through the sterilization unit.

DETAILED DESCRIPTION OF THE PREFERRED EMBODIMENTS

Figure 1:
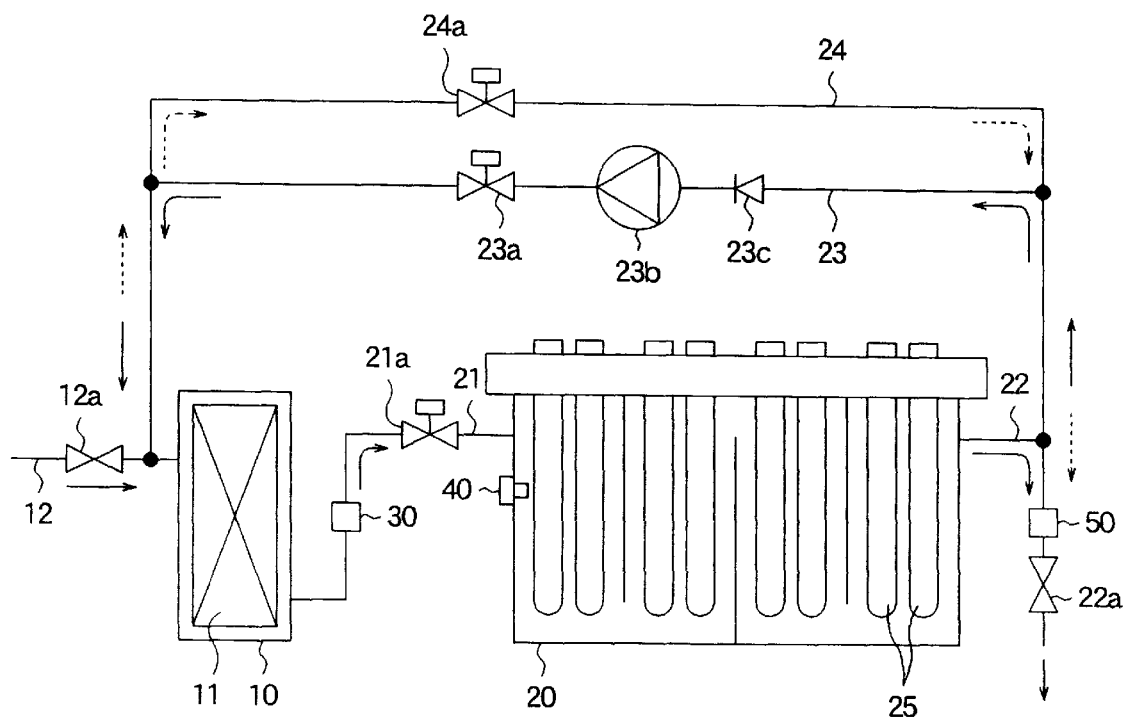
FIG. 1 is a schematic view of a water purifying apparatus according to a first embodiment of this invention.

Now, description will be made about several embodiments of this invention with reference to the drawing.

At first referring to FIG. 1, a water purifying apparatus according to a first embodiment of this invention comprises a purification unit 10 for filtering raw water to produce filtered water, a sterilization unit 20 supplied with the filtered water from the purification unit 10 for irradiating the filtered water with ultraviolet rays to produce treated water which has been filtered and sterilized, a flow rate sensor 30 for detecting a flow rate of the filtered water supplied to the sterilization unit 20 as a detected flow rate, a water temperature sensor 40 for detecting the water temperature in the sterilization unit 20 as a detected water temperature, a water supply sensor 50 for detecting occurrence or suspension of water supply of the treated water out of the apparatus, and a control section 60 for controlling an operation of the water purifying apparatus.

The purification unit 10 includes a filter 11 and is arranged upstream within the apparatus. Specifically, an inlet pipe 12 with a switching valve 12a is connected to a inlet port of the purification unit 10.

The sterilization unit 20 is arranged downstream of the purification unit 10. The sterilization unit 20 has an inlet port connected through a communication pipe 21 with a first electromagnetic valve 21a to an outlet port of the purification unit 10. The sterilization unit 20 has an outlet port connected to an outlet pipe 22 with an opened and closed valve 22a. The inlet pipe 12 and the outlet pipe 22 are connected to each other through a recirculating pipe 23 and a bypass pipe 24 arranged in parallel to each other. The recirculating pipe 23 is provided with a second electromagnetic valve 23a, a pump 23b, and a check valve 23c. When the second electromagnetic valve 23a and the pump 23b are activated, the treated water is recirculated from the outlet port of the sterilization unit 20 through the recirculating pipe 23 to the inlet port of the purification unit 10. A combination of the second electromagnetic valve 23a and the pump 23b will be referred to as a water returning arrangement. The bypass path 24 is provided with a third electromagnetic valve 24a.

The sterilization unit 20 comprises a plurality of ultraviolet (UV) lamps 25 arranged inside. The ultraviolet lamps 25 serve to produce ultraviolet rays for irradiating the filtered water supplied from the purification unit 10 into the sterilization unit 20.

The flow rate sensor 30 comprises a known flow rate detector and is attached to the communication pipe 21 between the purification unit 10 and the sterilization unit 20.

The water temperature sensor 40 comprises a known temperature detector and is adapted to detect the water temperature within the sterilization unit 20.

The water supply sensor 50 comprises a known water supply sensor and is attached to the outlet pipe 22 connected to the sterilization unit 20.

The control section 60 comprises a microcomputer and is connected to the first, the second, and the third electromagnetic valves 21a, 23a, and 24a, the pump 23b, each of the ultraviolet lamps 25 in the sterilization unit 20, the flow rate sensor 30, the water temperature sensor 40, and the water supply sensor 50. The control section 60 is connected to a first timer 61 and a second timer 62.

In the water purifying apparatus of the above-mentioned structure, the raw water such as tap water is supplied through the inlet pipe 12 into the purification unit 10. The filter 11 in the purification unit 10 removes various pollutants, such as suspended solids, Protozoa, microorganisms, and organic substances, contained in the raw water. Thus, the raw water is filtered by the purification unit 11 to produce filtered water. The filtered water is supplied through the communication pipe 21 to the sterilization unit 20. In the sterilization unit 20, the ultraviolet lamps 25 produce the ultraviolet rays to irradiate the filtered water. Thus, the filtered water is sterilized by the sterilizing effect of the ultraviolet rays to produce the treated water.

Figure 3:
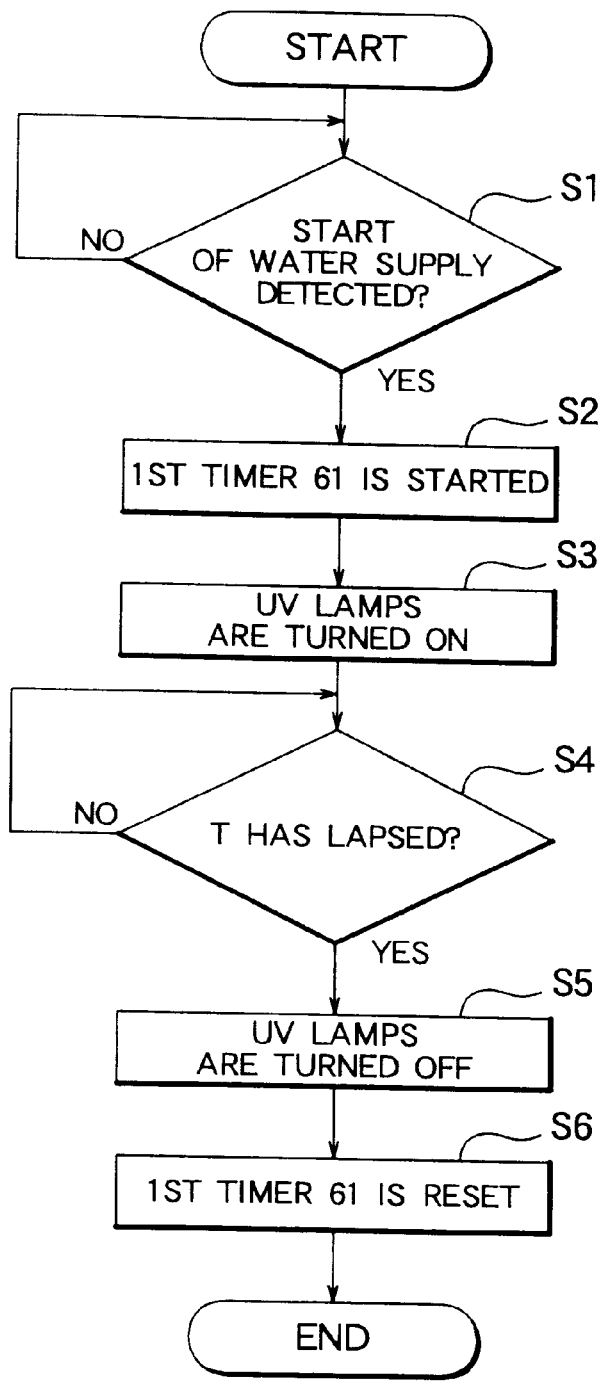
FIG. 3 is a flow chart for describing an operation of the water purifying apparatus illustrated in FIG. 1.

Referring to FIG. 3, the description will be made about an operation of the water purifying apparatus under control of the control section 60 during a water supply period in which water supply is performed. When the water supply sensor 50 detects a start of water supply of the treated water out of the apparatus (YES in Step S1), the first timer 61 is activated (Step S2). When the first timer 61 is activated, the control section 60 turns on the ultraviolet lamps 25 (Step S3). After lapse of a predetermined activation period T (YES in Step S4) determined by the first timer 61, the control section 60 turns off the ultraviolet radiation lamps 25. Then, the first timer 61 is initialized or reset (Step S6).

The treated water produced by the sterilization unit 20 is supplied through the outlet pipe 22 to an external terminal unit such as a tap in a house. In accordance with supply of the treated water to the external terminal unit, the sterilization unit 20 is supplied with the filtered water from the purification unit 10. As a result, the water is gradually changed in the sterilization unit 20. It is preferable that the predetermined activation period T is determined to nearly correspond to a time period while the water is fully changed in the sterilization unit 20 with the treated water flowing out through the opened and closed valve 22a.

Figure 4:
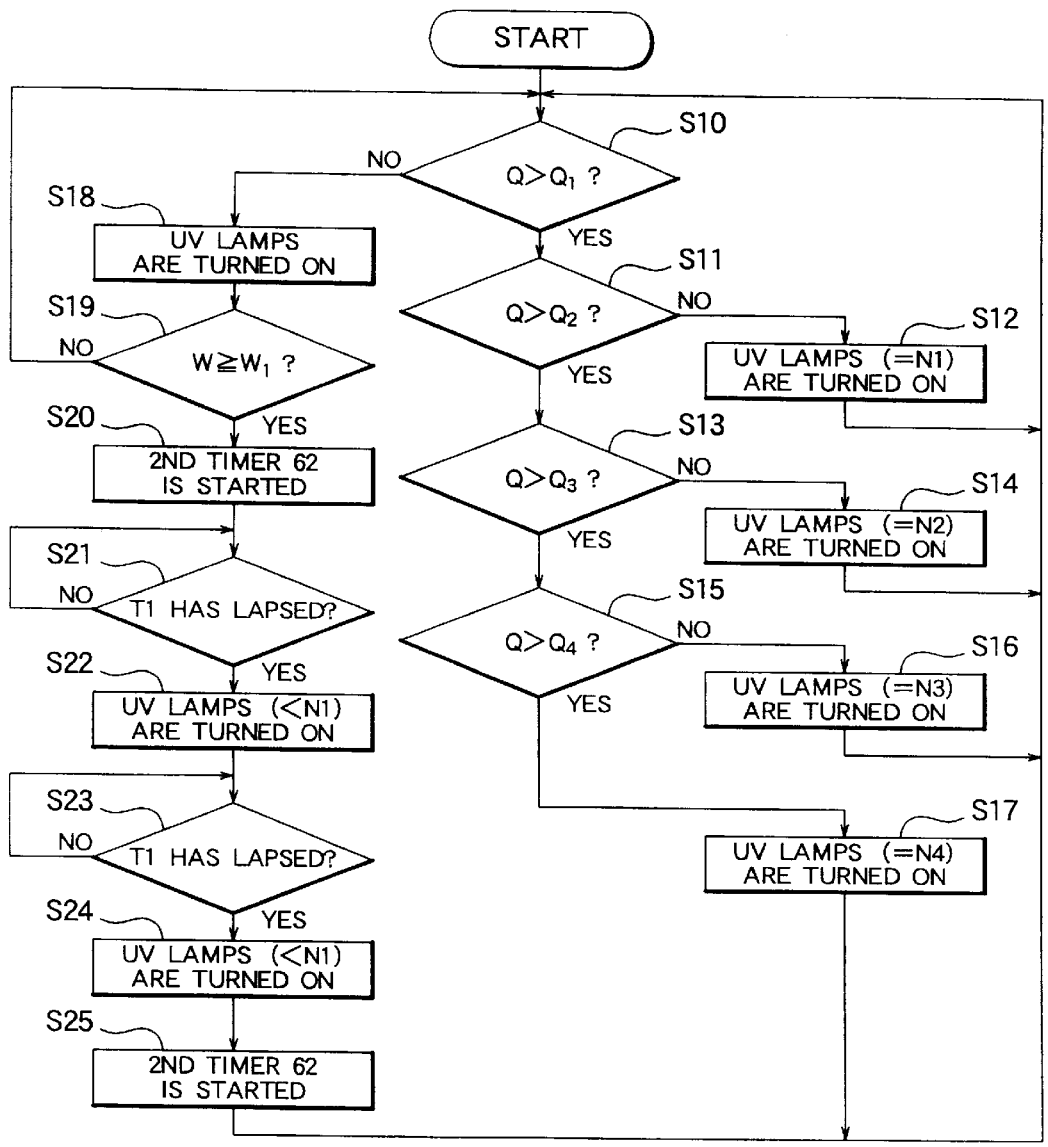
FIG. 4 is a flow chart for describing an operation of a modification of the water purifying apparatus illustrated in FIG. 3.

Referring to FIG. 4, the description will be directed to a modification of the water purifying apparatus. In the modification, the control section 60 controls the ultraviolet lamps 25 in the following manner.

When the detected flow rate Q detected by the flow rate sensor 30 is greater than a first reference flow rate Q1 (YES in Step S10) and is not greater than a second reference flow rate Q2 (NO in Step S11), the ultraviolet lamps 25 are selectively activated or turned on so that the number of active ones of the ultraviolet lamps 25 is equal to a first count N1 (Step S12). When the detected flow rate Q is greater than the second reference flow rate Q2 (YES in Step S11) and is not greater than a third reference flow rate Q3 (NO in Step S13), the ultraviolet lamps 25 are selectively turned on so that number of active ones is equal to a second count N2 (Step S14). When the detected flow rate Q is greater than the third reference flow rate Q3 (YES in Step S13) and is not greater than a fourth reference flow rate Q4 (NO in Step S15), the ultraviolet lamps 25 are selectively turned on so that the number of active ones is equal to a third count N3 (Step S16). When the detected flow rate Q is greater than the fourth reference flow rate Q4 (YES in Step S15), the ultraviolet lamps 25 are selectively turned on so that the number of active ones is equal to a fourth count N4 (Step S17). It is noted here that the first through the fourth reference flow rates have a relationship $Q1<Q2<Q3<Q4$ and that the first through the fourth counts have a relationship $N1<N2<N3<N4$.

On the other hand, when the detected flow rate Q is not greater than the first reference flow rate Q1 (NO in Step S10), all of the ultraviolet lamps 25 are turned off (Step S18). In this event, when the detected water temperature W detected by the water temperature sensor 40 is not lower than a first reference level W1 (YES in Step S19), the second timer 62 is started (Step S20). After lapse of a first time interval T1 as a predetermined delay period (YES in Step S21), the ultraviolet lamps 25 are selectively turned on so that the number of active ones is smaller than the first count N1 (Step S22). Then, after lapse of a second time interval T2 as a predetermined activation period (YES in Step S23), the ultraviolet lamps 25 are turned off (Step S24) and the second timer 62 is reset (Step S25). Then, the operation returns to Step S10. Thus, during the water supply period, the number of active ones of the ultraviolet lamps 25 as well as the time of activation are controllably varied in response to the detected flow rate and the detected water temperature. Therefore, the ultraviolet lamps 25 are efficiently used so that the frequency of exchange is reduced and the maintenance is facilitated. In the event, the control section 60 will be referred to as a lamp control arrangement.

Figure 5:
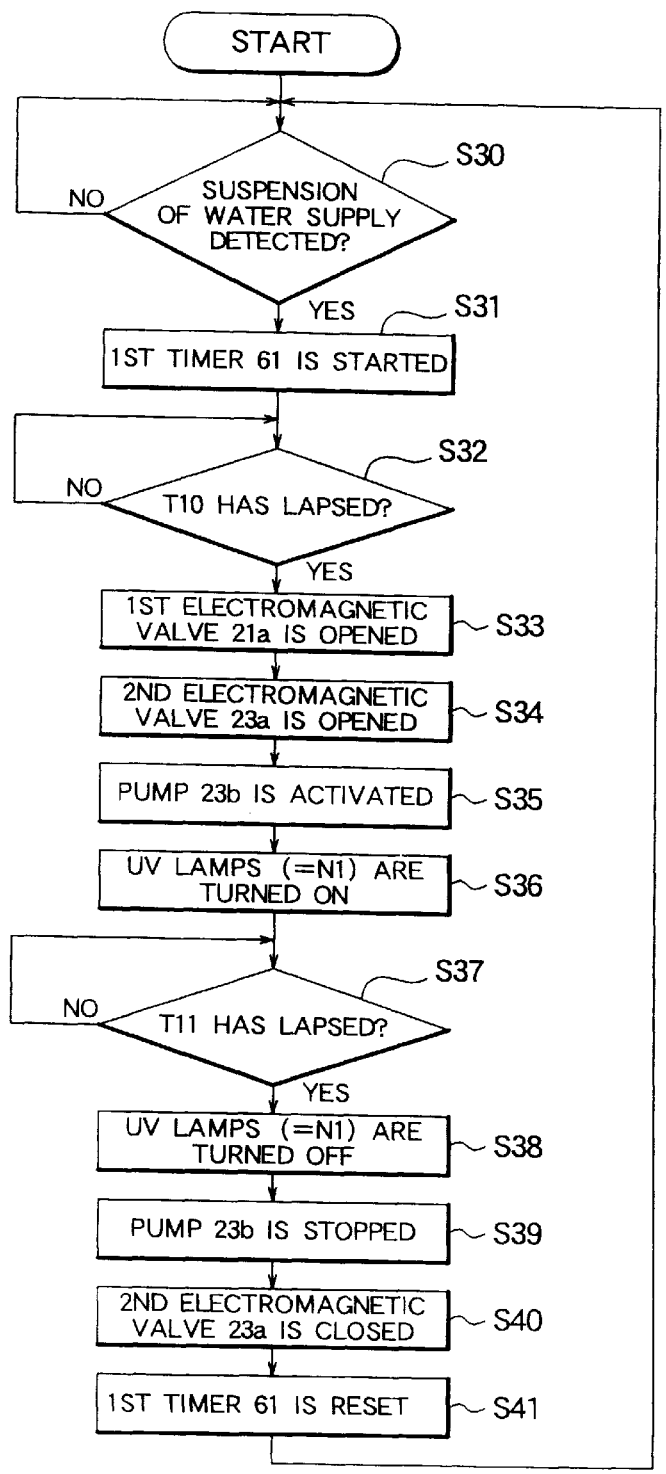
FIG. 5 is a flow chart for describing the operation of the water purifying apparatus illustrated in FIG. 1 during a suspension period.

Referring to FIG. 5, the description will be made about the operation of the water purifying apparatus under control of the control section 60 during a suspension period in which water supply is suspended.

When the water supply sensor 50 detects suspension of water supply (YES in Step S30), the first timer 61 is started (Step S31). In this event, the first timer 61 will be referred to as a particular time determining arrangement determining a particular time period or a predetermined delay period T10.

After the lapse of the predetermined delay period T10 (YES in Step S32), the control section 60 makes the first electromagnetic valve 21a be kept opened (Step S33) and the second electromagnetic valve 23a be opened (Step S34). In addition, the control section 60 activates the pump 23b (Step S35) and turns on the ultraviolet lamps 25, equal in number to N1 (Step S36). Thus, as depicted by solid double-headed arrows in FIG. 1, the treated water is circulated through the sterilization and the purification units 10 and 20 via the recirculating pipe 23. On carrying out the steps S33–S36, the control section 60 will be starting arrangement. A combination of the recirculating pipe 23, the pump 23b, the second electromagnetic valve 23a, and the check valve 23c is referred to as a recirculating arrangement.

Such recirculation continues until a predetermined recirculating period T11 has lapsed. The predetermined recirculating period T11 is determined as a specific time period by the first timer 61. In this event, the first timer 61 will be referred to as a specific time determining arrangement.

After lapse of the predetermined recirculating period T11 (YES in Step S37), the control section 60 turns off the ultraviolet lamps 25 (Step S38) and stops the pump 23b (Step S39). In addition, the control section 60 closes the second electromagnetic valve 23a (Step S40) and resets the first timer 61 (Step S41). On carrying out the steps S38–S40, the control section 60 will be referred to as a stopping arrangement.

Then, the operation returns to Step S30. Thus, even during the suspension period, the treated water reserved in the water purifying apparatus is circulated through the sterilization unit 20 and the purification unit 10 via the recirculating pipe 23 (hereinafter referred to as a recirculating operation). In the sterilization unit 20, the ultraviolet lamps 25 produce the ultraviolet rays for irradiating the treated water (hereinafter referred to as an ultraviolet radiating operation). The recirculating operation and the ultraviolet radiating operation are simultaneously carried out throughout the recirculating period. Therefore, growth and propagation of bacteria and microorganisms within the purifying apparatus are inhibited.

In order to use the raw water such as the tap water while the purification unit 10 or the sterilization unit 20 is being repaired, the first and the second electromagnetic valves 21a and 23a are closed and the third electromagnetic valve 24a is opened. Then, the tap water flows through the bypass pipe 24 as depicted by broken-line arrows in FIG. 1 without passing through the purification unit 10 and the sterilization unit 20 to be supplied through the outlet pipe 22 to an external terminal unit such as a tap in a house.

Figure 2:
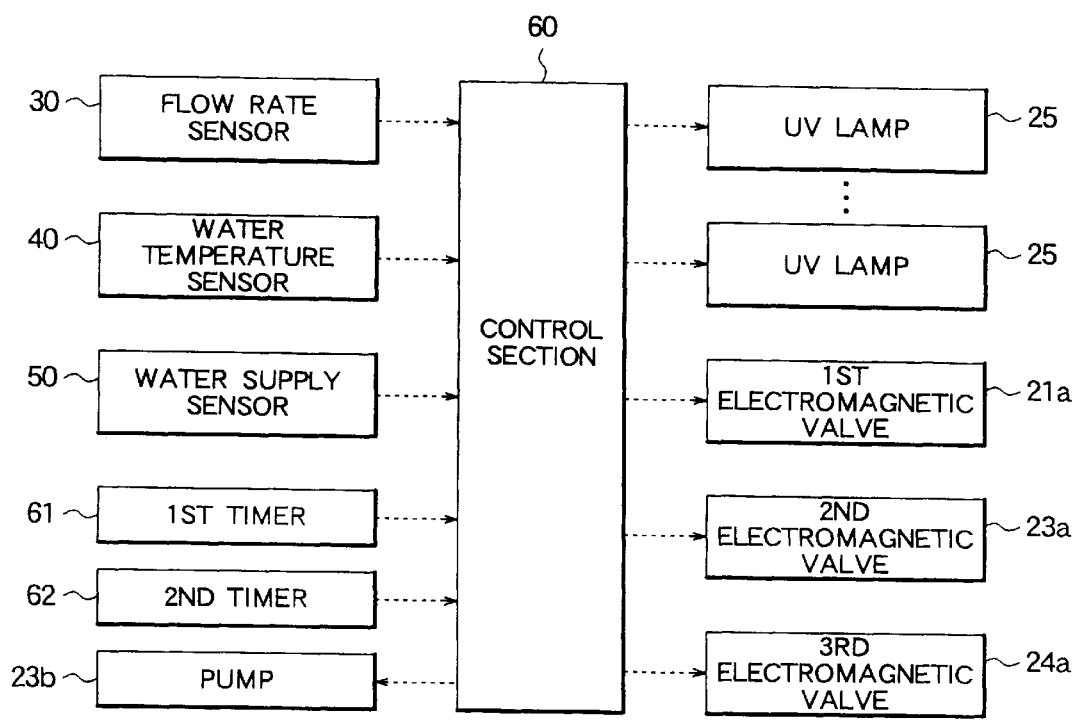
FIG. 2 is a block diagram showing a control system of the water purifying apparatus in FIG. 1.
Figure 6:
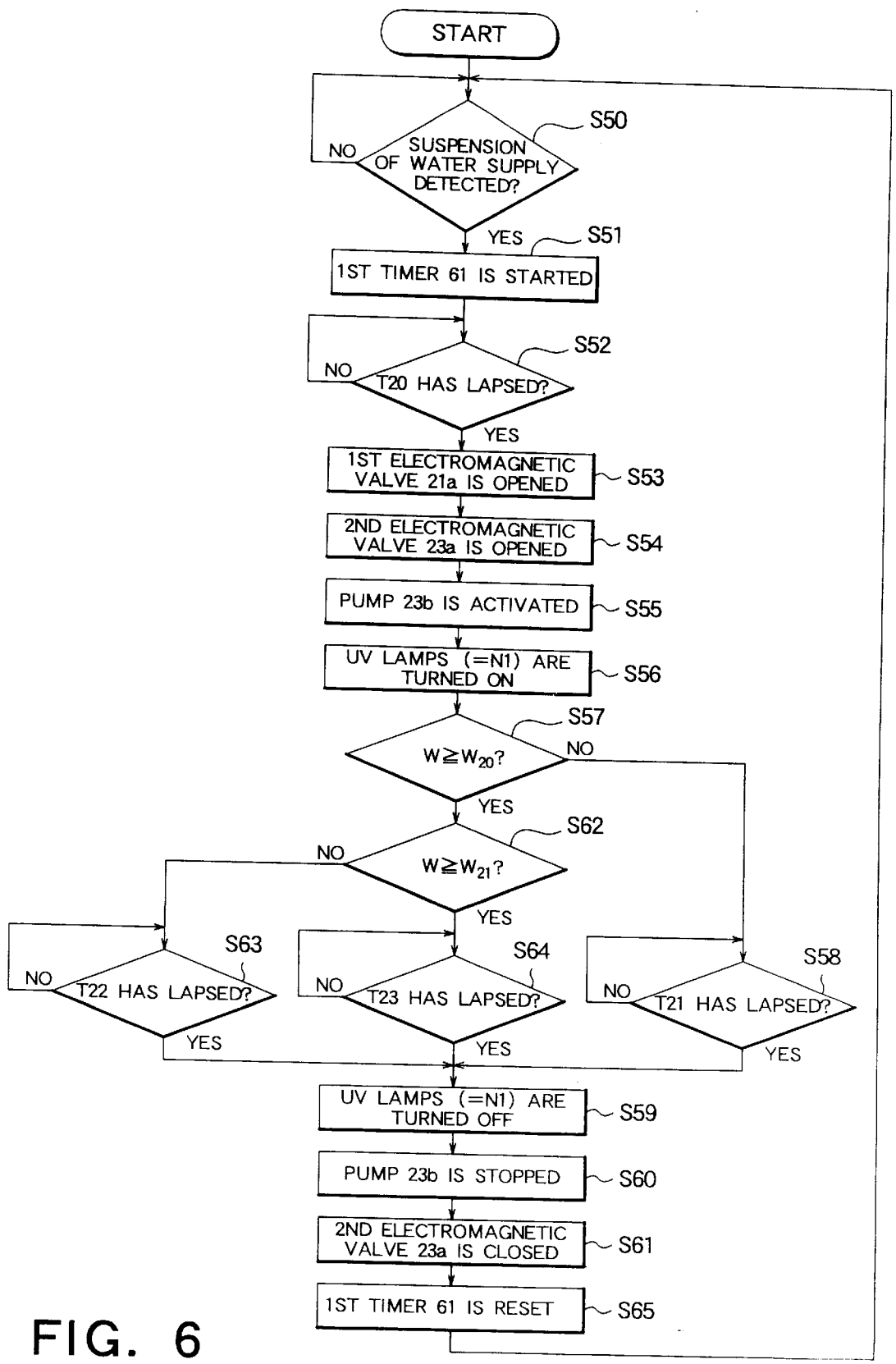
FIG. 6 is a flow chart for describing an operation of a water purifying apparatus according to a second embodiment of this invention during a suspension period.

Referring to FIG. 6, a water purifying apparatus according to a second embodiment of this invention will be described. The water purifying apparatus according to the second embodiment is similar in structure to the first embodiment illustrated in FIGS. 1 and 2. Therefore, description will be directed to an operation of the apparatus alone.

When the water supply sensor 50 detects suspension of water supply (YES in Step S50), the first timer 61 is started (Step S51). After lapse of a predetermined delay period T20 (YES in Step S52) determined by the first timer 61, the control section 60 opens the first and the second electromagnetic valves 21a and 23a (Steps S53 and S54). In addition, the control section 60 activates the pump 23b (Step S55) and turns on the ultraviolet lamps 25, equal in number to N1 (Step S56). Thus, the recirculating operation as depicted by the solid double-headed arrows in FIG. 1 and the ultraviolet radiating operation are carried out so that the treated water is repeatedly filtered and sterilized. During execution of the above-mentioned two operations, the temperature of the treated water is detected by the water temperature sensor 40. Then, the control section 60 judges about whether or not the detected water temperature W detected by the water temperature sensor 40 is lower than a first reference level W20 (Step S57).

When the detected water temperature W is lower than the first reference level W20 (NO in Step S57), judgement is made about whether or not a first predetermined recirculating period T21 has lapsed (Step S58). When the first predetermined recirculating period T21 has lapsed (YES in Step S58), the control section 60 turns off the ultraviolet lamps 25 (Step S59) and stops the pump 23b (Step S60). In addition, the control section 60 closes the second electromagnetic valve 23a (Step S61) and resets the first timer 61 (Step S65). Then, the operation returns to Step S50. Thus, the recirculating operation and the ultraviolet radiating operation are stopped and the operation returns to Step S50 after the first timer 61 is reset.

When the detected temperature W is not lower than the first reference level W20 (YES in Step S57) and lower than a second reference level W21 (NO in Step S62), judgement is made about whether or not a second predetermined recirculating period T22 has lapsed (Step S63). When the second predetermined recirculating period T22 has lapsed (YES in Step S63), the control section 60 turns off the ultraviolet lamps 25 (Step S59) and stops the pump 23b (Step S60). In addition, the control section 60 closes the second electromagnetic valve 23a (Step S61) and rests the first timer 61 (Step S65). Then, the operation returns to Step S50. Thus, the recirculating operation and the ultraviolet radiating operation are stopped and the operation returns to Step S50 after the first timer 61 is reset.

When the detected temperature W is not lower than the second reference level W21 (YES in Step S62), judgement is made about whether or not a third predetermined recirculating period T23 has lapsed (Step S64). When the third predetermined recirculating period T23 has lapsed (YES in Step S64), the control section 60 turns off the ultraviolet lamps 25 (Step S59) and stops the pump 23b (Step S60). In addition, the control section 60 closes the second electromagnetic valve 23a (Step S61) and resets the first timer 61 (Step S65). Then, the operation returns to Step S50. Thus, the recirculating operation and the ultraviolet radiating operation are stopped and the operation returns to Step S50 after the first timer 61 is reset. On carrying out the steps S57, S58, S62, S63, and S64, the control section 60 will be referred to as a time control arrangement.

It is noted here that the first and the second reference levels W20 and W21 have a relationship W20<W21 and that the first through the third predetermined recirculating periods T21, T22, and T23 have a relationship T21<T22<T23. Therefore, while the recirculating operation and the ultraviolet radiating operation are carried out during the suspension period, the control section 60 varies the recirculating period so that it is long and short when the detected water temperature is high and low, respectively.

As described above, according to a second embodiment, the treated water reserved in the water purifying apparatus is circulated through the sterilization unit 20 and the purification unit 10 via the recirculating pipe 23 during the suspension period. Thus, even during the suspension period, the treated water is subjected to ultraviolet radiation by the ultraviolet lamps 25 in the sterilization unit 20. Therefore, growth and propagation of bacteria and microorganisms in the water purifying apparatus is inhibited. In the suspension period, the ultraviolet lamps 25 are activated during the recirculating period controllably varied in response to the detected water temperature. Therefore, the ultraviolet lamps 25 are efficiently used so that the frequency of exchange is reduced and the maintenance is facilitated.

Figure 7:
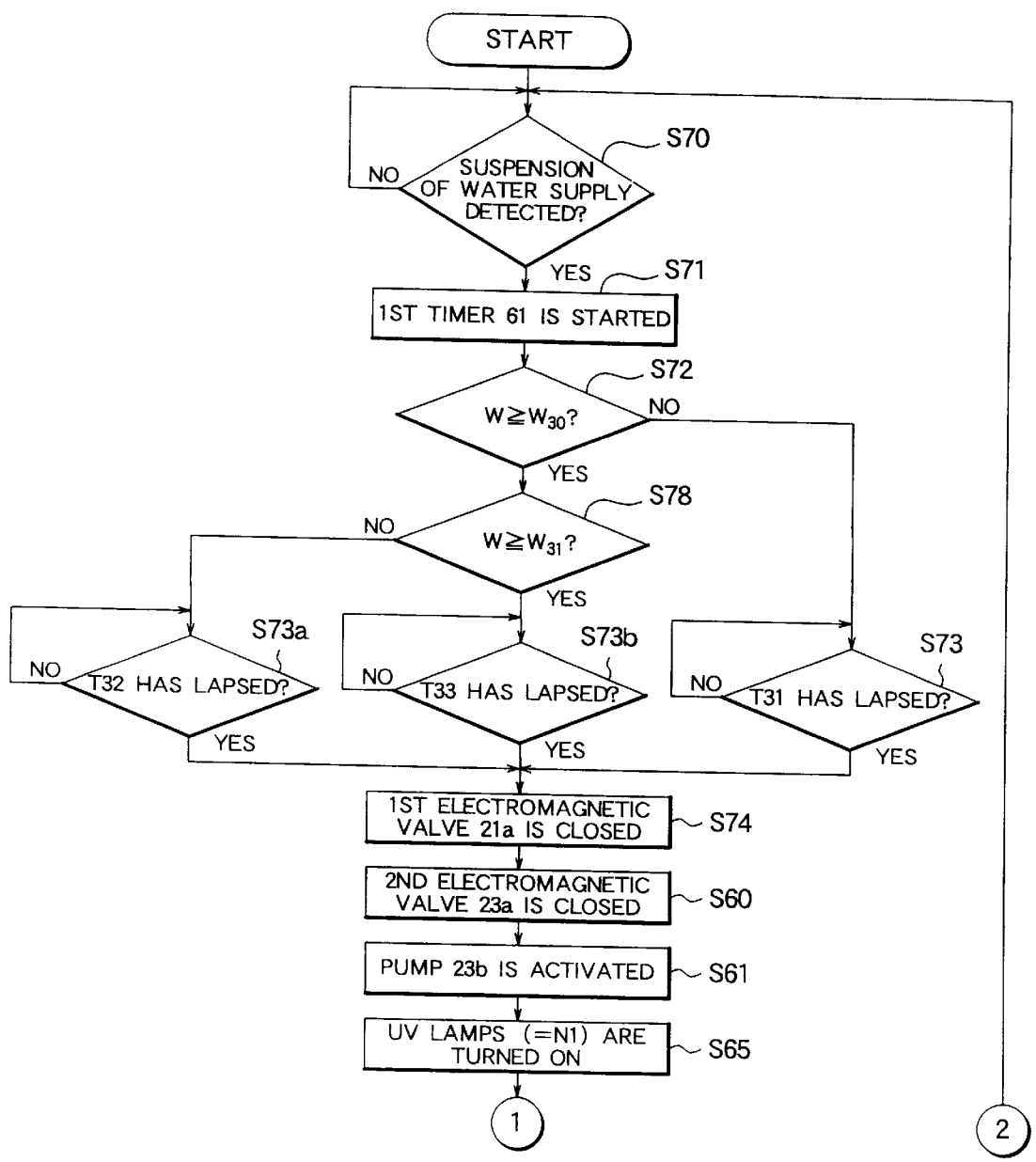
FIG. 7 is a flow chart for describing a first half of an operation of a water purifying apparatus according to a third embodiment of this invention during a suspension period.
Figure 8:
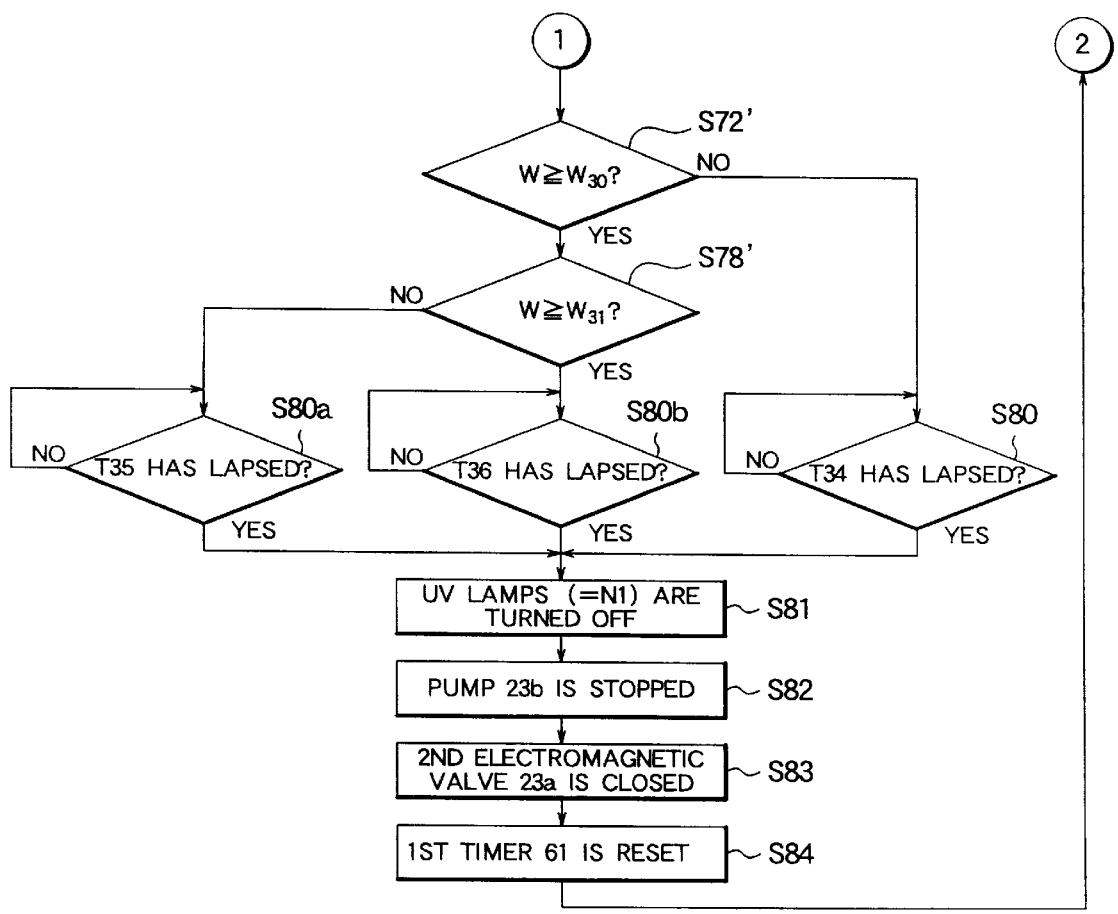
FIG. 8 is a flow chart for describing a second half of the operation following the first half illustrated in FIG. 7.

Next, referring to FIGS. 7 and 8, a water purifying apparatus according to a third embodiment of this invention will be described. The water purifying apparatus according to the third embodiment is similar in structure to the first embodiment illustrated in FIGS. 1 and 2. Therefore, description will be directed to an operation of the apparatus alone.

When the water supply sensor 50 detects suspension of water supply (YES in Step S70), the first timer 61 is started (Step S71). Judgement is made about whether or not the detected water temperature W detected by the water temperature sensor 40 is lower than a first reference level W30 (Step S72). If the detected water temperature W is lower than the first reference level W30 (NO in Step S72), judgement is made about whether or not a first predetermined delay period T31 has lapsed (Step S73). If the first predetermined delay period T31 has lapsed (YES in Step S73), the first and the second electromagnetic valves 21a and 23a are opened (Steps S74 and S75). The pump 23b is activated (Step S76) and the ultraviolet lamps 25b, equal in number to N1, are turned on (Step S77). Thus, the recirculating operation as depicted by the solid double-headed arrows in FIG. 1 and the ultraviolet radiating operation are carried out so that the treated water is repeatedly filtered and sterilized.

If the detected water temperature W is not lower than the first reference level W30 (YES in Step S72) and lower than a second reference level W31 (NO in Step S78), judgement is made about whether or not a second predetermined delay period T32 has lapsed (Step S73a). When the second predetermined delay period T32 has lapsed (YES in Step S73a), Steps S74 through S77 are carried out. In other words, the recirculating operation and the ultraviolet radiating operation are carried out in the similar manner.

If the detected water temperature W is not lower than the second reference level W31 (YES in Step S78), judgement is made about whether or not a third predetermined delay period T33 has lapsed (Step S73b). When the third predetermined delay period T33 has lapsed (YES in Step S73b), the steps S74 through S77 are carried out. In other words, the recirculating operation and the ultraviolet radiating operation are carried out in the similar manner.

During the above-mentioned operations, the water temperature sensor 40 detects the temperature of the treated water. Again, judgement is made about whether or not the detected water temperature W detected by the temperature sensor 40 is lower than the first reference level W30 (Step S72'). If the detected water temperature W is lower than the first reference level W30 (NO in Step S72'), judgement is made about whwether or not a first predetermined recirculating period T34 has lapsed (Step S80). If the first predetermined recirculating period T34 has lapsed (YES in Step S80), the ultraviolet lamps 25 are turned off (Step S81) and the pump 23b is stopped (Step S82). The second electromagnetic valve 23a is closed (Step S83) and the first timer 61 is reset (Step S84). Then, the operation returns to Step S70. In other words, the recirculating operation and the ultraviolet radiating operation are stopped and the operation returns to Step S70 after the first timer 61 is reset.

If the detected water temperature W is not lower than the first reference level W30 (YES in Step S72') and is lower than the second reference level W31 (NO in Step S78'), judgement is made about whether or not a second predetermined recirculating period T35 has lapsed (Step S80a). If the second predetermined recirculating period T35 has lapsed (YES in Step S80a), the operation returns to Step S70 via Steps S81 through S84 described above. In other words, the recirculating operation and the ultraviolet radiating operation are stopped and the operation returns to Step S70 after the first timer 61 is reset.

If the detected water temperature W is not lower than the second reference level W31 (YES in Step S78'), judgement is made about whether or not a third predetermined recirculating period T36 has lapsed (Step S80b). If the third predetermined recirculating period T36 has lapsed, the operation returns to Step S70 via Steps S81 through S84 described above. In other words, the recirculating operation and the ultraviolet radiating operation are stopped and the operation returns to Step S70 after the first timer 61 is reset.

It is noted here that the first and the second reference levels W30 and W31 have a relationship W30<W31. The first through the third predetermined delay periods T31, T32, and T33 have a relationship T31>T32>T33 while the first through the third predetermined recirculating periods T34, T35, and T36 have a relationship T34<T35<T36. Thus, the control section 60 controls the delay period so that it is short and long when the detected water temperature is high and low, respectively. As will be understood from the foregoing, the delay period is a time duration before the recirculating operation and the ultraviolet radiating operation are started after detection of suspension of water supply. Furthermore, the control section 60 controls the recirculating period so that it is long and short when the detected water temperature is high and low, respectively.

As described above, according to the third embodiment, the treated water reserved in the water purifying apparatus is circulated through the sterilization unit 20 and the purification unit 10 via the recirculating pipe 23 during the suspension period. Thus, even during the suspension period, the treated water is subjected to ultraviolet radiation by the ultraviolet lamps 25 in the sterilization unit 20. Therefore, growth and propagation of bacteria and microorganisms in the water purifying apparatus is inhibited. During the suspension period, the ultraviolet lamps 25 are turned on after the delay period controllably varied in response to the detected water temperature and are kept activated for the recirculating period controllably varied in response to the detected water temperature. Therefore, the ultraviolet lamps 25 are efficiently used so that the frequency of exchange is reduced and maintenance is facilitated.

Figure 9:
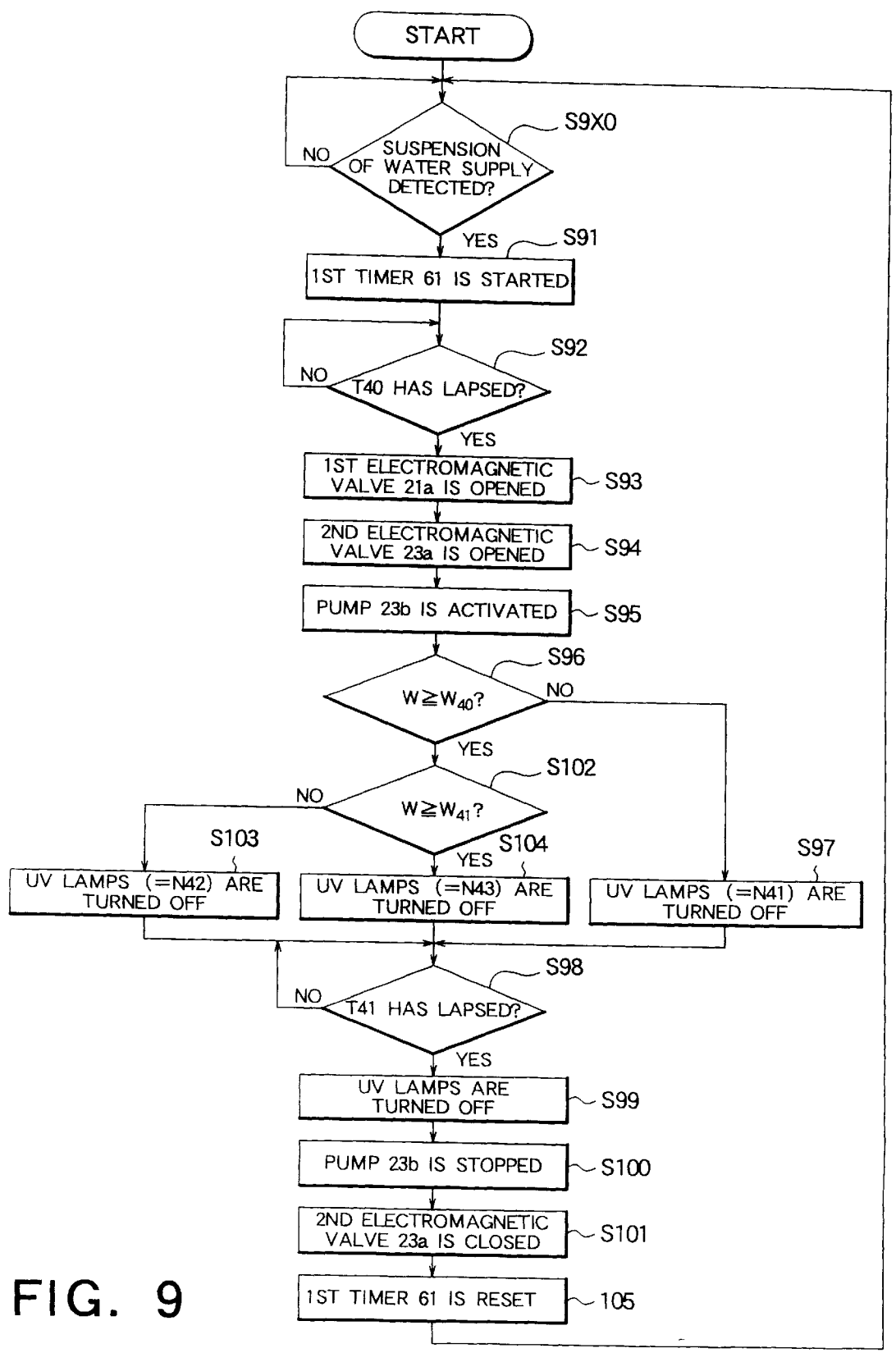
FIG. 9 is a flow chart for describing an operation of a water purifying apparatus according to a fourth embodiment of this invention during a suspension period.

Referring to FIG. 9, a water purifying apparatus according to a fourth embodiment of this invention will be described. The water purifying apparatus according to the fourth embodiment is similar in structure to the first embodiment illustrated in FIGS. 1 and 2. Therefore, description will be directed to an operation of the apparatus alone.

When the water supply sensor 50 detects suspension of water supply (YES in Step S90), the first timer 61 is started (Step S91). Judgement is made about whether or not a predetermined delay period T40 has lapsed (Step S92). If the predetermined delay period T40 has lapsed (YES in Step S92), the first and the second electromagnetic valves 21a and 23a are opened (Steps S93 and S94). The pump 23b is activated (Step S95). Thus, as depicted by the solid double-headed arrows in FIG. 1, the treated water is circulated through the sterilization and the purification units 10 and 20 via the recirculating pipe 23 so that the treated water is repeatedly filtered and sterilized. Thereafter, judgement is made about whether or not the detected water temperature W detected by the water temperature sensor 40 is lower than a first reference level W40 (Step S96).

If the detected temperature W is lower than the first reference level W40 (NO in Step S96), the ultraviolet lamps 25, equal in number to a first count N41, are turned on (Step S97). Judgement is made about whether or not a predetermined recirculating period T41 has lapsed (Step S98). If the predetermined recirculating period T41 has lapsed (YES in Step S98), the ultraviolet lamps 25 are turned off (Step S99) and the pump 23b is stopped (Step S100). The second electromagnetic valve 23a is closed (Step S101) and the first timer 61 is reset (Step S105). Then, the operation returns to Step S90.

If the detected water temperature W is not lower than the first reference level W40 (YES in Step S96) and is lower than a second reference level W41 (NO in Step S102), the ultraviolet lamps 25, equal in number to a second count N42, are turned on (Step S103). Thereafter, judgement is made about whether or not the predetermined recirculating period T41 has lapsed (Step S98). If the predetermined recirculating period T41 has lapsed (YES in Step S98), the operation returns to Step S90 via Steps S99 through S101 and S105 described above.

If the detected water temperature W is not lower than the second reference level W41 (YES in Step S102), the ultraviolet lamps 25, equal in number to a third count N43, are turned on (Step S104). Thereafter, judgement is made about whether or not the predetermined recirculating period T41 has lapsed (Step S98). If the predetermined recirculating period T41 has lapsed (YES in Step S98), the operation returns to Step S90 via Steps S99 through S101 and S105 described above.

It is noted here that the first and the second reference levels W40 and W41 have a relationship W40<W41 and that the first through the third counts N41, N42, and N43 have a relationship N41<N42<N43. Thus, the control section 60 controls the number of active ones of the ultraviolet lamps 25 to be activated upon the recirculating operation so that it is reduced and increased when the detected water temperature is low and high, respectively.

Thus, even during the suspension period, the treated water reserved in the water purifying apparatus is circulated through the sterilization unit 20 and the purification unit 10 via the recirculating pipe 23. Therefore, growth and propagation of bacteria and microorganisms in the water purifying apparatus is inhibited. The number of active ones of the ultraviolet lamps 25 to be activated during the suspension period is controlled in response to the detected water temperature. Therefore, the ultraviolet lamps 25 are efficiently used so that the frequency of exchange is reduced and the maintenance is facilitated.

Figure 10:
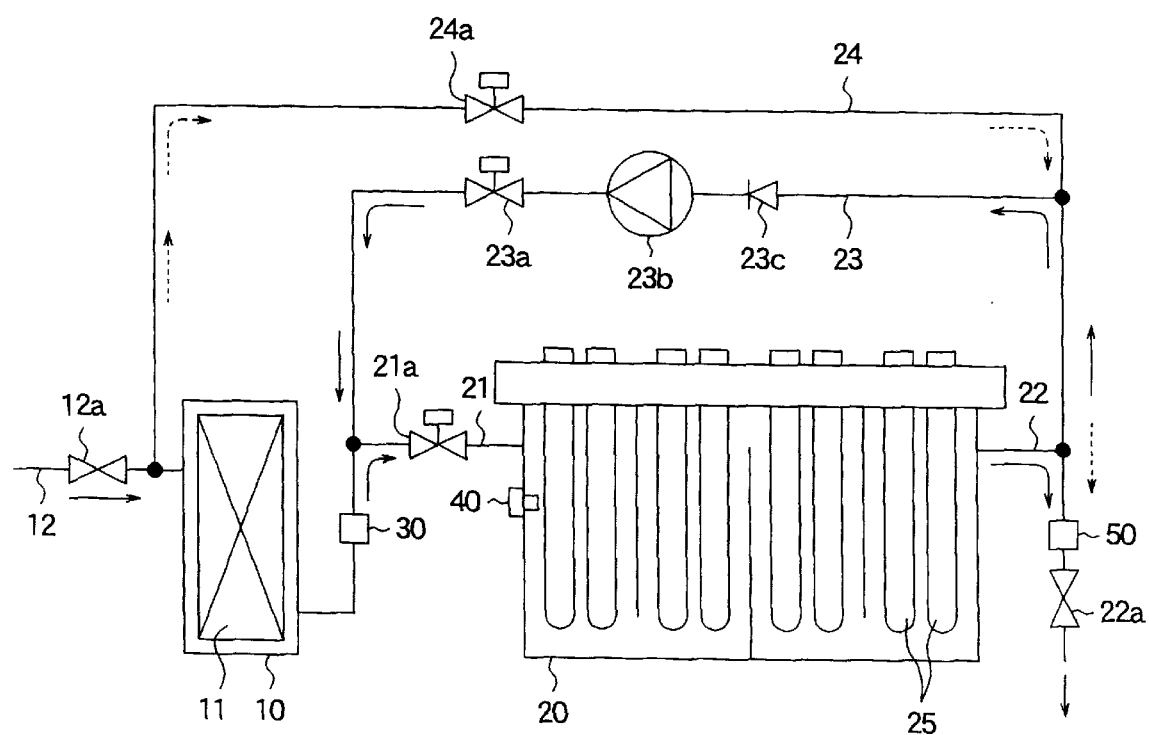
FIG. 10 is a schematic view of a water purifying apparatus according to a fifth embodiment of this invention.

Referring to FIG. 10, a water purifying apparatus according to a fifth embodiment of this invention is similar in structure to the first embodiment except that the recirculating pipe 23 is connected between the communicating pipe 21 and the outlet port of the sterilization unit 20. Specifically, the recirculating pipe 23 has one end at the side of the second electromagnetic valve 23a and is connected at the one end to the communicating pipe 21 connecting the purification unit 10 and the sterilization unit 20. During the suspension period, the treated water is circulated through the sterilization unit 20 alone via the recirculating pipe 23.

Generally, the frequency of maintenance is lower in the purification unit 10 than in the sterilization unit 20. Therefore, the maintenance of the sterilization unit 20 alone may be taken into consideration as will hereinafter be described.

Figure 11:
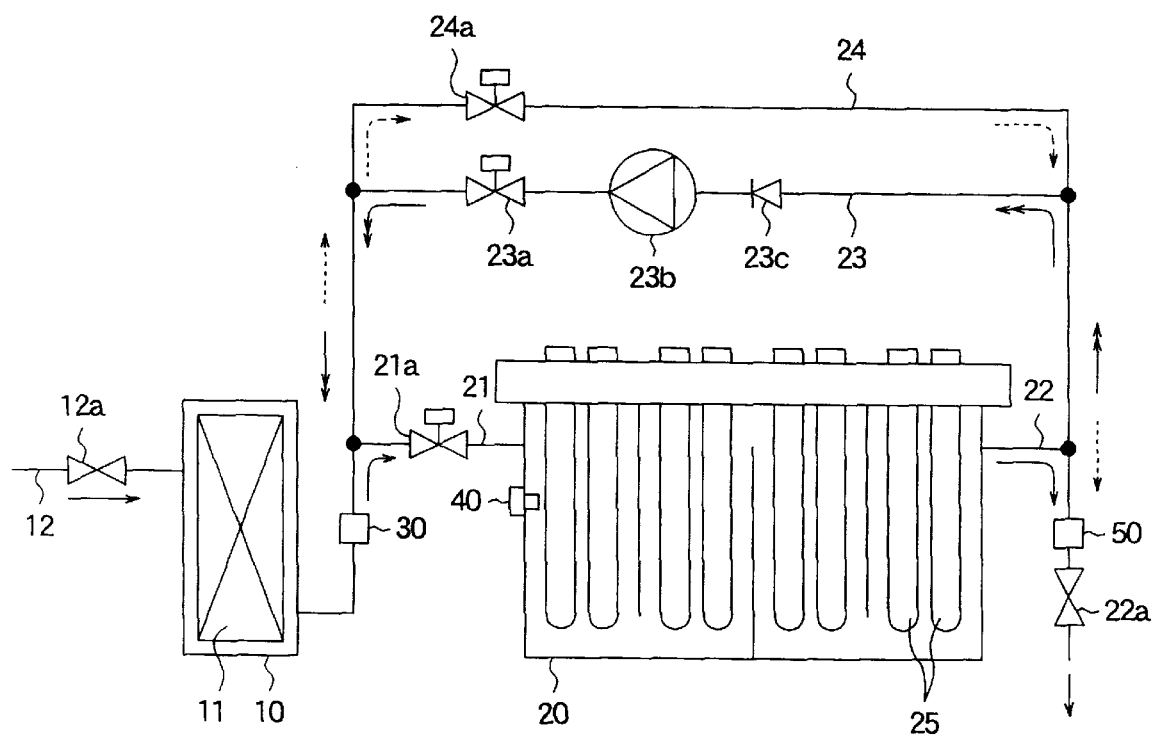
FIG. 11 is a schematic view of a water purifying apparatus according to a sixth embodiment of this invention.

Referring to FIG. 11, a water purifying apparatus according to a sixth embodiment of this invention is similar in structure to the fifth embodiment except that the bypass pipe 24 is connected between the communicating pipe 21 and the outlet port of the sterilization unit 20. Specifically, one end of the bypass pipe 24 is connected to the one end to the communicating pipe 21 at a position between the flow rate sensor 30 and the first electromagnetic valve 21a. During the maintenance of the sterilization unit 20, the filtered water flows through the bypass pipe 24 without passing through the sterilization unit 20.

In the first through the sixth embodiments, the water supply sensor 50 attached to the outlet pipe 22 downstream of the sterilization unit 20 detects occurrence of water supply of the treated water out of the apparatus. However, it will readily be understood that this invention is not restricted to the above-mentioned structure but such detection may be carried out by the flow rate sensor 30 attached to the communication pipe 21 located upstream of the sterilization unit 20. It is noted here that, upon occurrence of water supply, the raw water flows into the water purifying apparatus. Thus, detection of water supply is equivalent to detection of introduction of the raw water into the apparatus. In each of the first through the sixth embodiments, the control section 60 is operable as a recirculation control arrangement for controlling operation of the recirculating arrangement in response to presence and absence of a supply detection signal which is produced in the water supply sensor 50 on supply of the treated water.

As described above, according to this invention, the number of active ones of the ultraviolet lamps to be activated as the sterilization unit and the time of activation are controlled in response to the detected flow rate or the detected water temperature during the water supply period. During the suspension period, the treated water is circulated within the water purifying apparatus and the number of active ones of the ultraviolet lamps to be activated as the sterilization unit and the time of activation are controlled in response to the detected flow rate or the detected water temperature. Therefore, it is possible to inhibit growth and propagation of bacteria and microorganisms within the water purifying apparatus during the suspension period. Furthermore, the ultraviolet lamps 25 are efficiently used so that the frequency of exchange is reduced and the maintenance is facilitated.

What is claimed is:

1. A water purifying apparatus comprising:
   a purification unit including a filter for filtering raw water to produce filtered water;
   a sterilization unit connected to said purification unit and supplied with said filtered water for irradiating said filtered water with ultraviolet rays to produce treated water which has been filtered and sterilized;
   a recirculating arrangement connected to said sterilization unit for recirculating said treated water through said sterilization unit;
   a water supply sensor connected to said sterilization unit for detecting supply of said treated water out of said water purifying apparatus to produce a supply detection signal;
   recirculation control means connected to said water supply sensor and said recirculating arrangement for controlling operation of said recirculating arrangement in response to presence and absence of said supply detection signal; and said recirculation control means comprising:

particular time determining means for determining a particular time period; and starting means connected to said particular time determining means, said water supply sensor, and said recirculating arrangement for starting said operation of the recirculating arrangement after lapse of said particular time period following reception of said detection signal.

2. A water purifying apparatus as claimed in claim 1, wherein said recirculation control means further comprises:

specific time determining means for determining a specific time period; and stopping means connected to said specific time determining means and said recirculating arrangement for stopping said operation of the recirculating arrangement after lapse of said specific time period following start of said operation of the recirculating arrangement.

3. A water purifying apparatus as claimed in claim 1, wherein said recirculation control means further comprises:

a water temperature sensor for detecting, as a detected water temperature, a temperature of one of said raw water, said filtered water, and said treated water; and time control means connected to said particular time determining means and said water temperature sensor for controlling said particular time period in response to said detected water temperature.

4. A water purifying apparatus as claimed in claim 1, wherein said sterilization unit having an inlet port for said filtered water and an outlet port for said treated water, said recirculating arrangement comprising:

a pipe connected between said inlet port and said outlet port; and water returning means connected to said pipe for returning said treated water from said outlet port to said inlet port.

5. A water purifying apparatus as claimed in claim 1, wherein said purification unit has an inlet port for said raw water, said sterilization unit having an outlet port for said treated water, said recirculating arrangement comprising:

a pipe connected between said inlet port and said outlet port; and water returning means connected to said pipe for returning said treated water from said outlet port to said inlet port.

6. A water purifying apparatus comprising:

a purification unit including a filter for filtering raw water to produce filtered water;

a sterilization unit connected to said purification unit and supplied with said filtered water for irradiating said filtered water with ultraviolet rays to produce treated water which has been filtered and sterilized;

a recirculating arrangement connected to said sterilization unit for recirculating said treated water through said sterilization unit;

a water supply sensor connected to said sterilization unit for detecting supply of said treated water out of said water purifying apparatus to produce a supply detection signal;

recirculation control means connected to said water supply sensor and said recirculating arrangement for controlling operation of said recirculating arrangement in response to presence and absence of said supply detection signal; and said recirculation control means comprising:

specific time determining means for determining a specific time period; and making means connected to said specific time determining means and said recirculating arrangement for making said recirculating arrangement recirculate said treated water through said sterilization unit during said specific time period.

7. A water purifying apparatus as claimed in claim 6, wherein said recirculation control means further comprises:

a water temperature sensor for detecting, as a detected water temperature, a temperature of one of said raw water, said filtered water, and said treated water; and time control means connected to said specific time determining means and said temperature sensor for controlling said specific time period in response to said detected water temperature.

8. A water purifying apparatus comprising:

a purification unit including a filter for filtering raw water to produce filtered water;

a sterilization unit including a plurality of ultraviolet radiation lamps, said sterilization unit being connected to said purification unit and supplied with said filtered water for irradiating said filtered water with ultraviolet rays to produce treated water which has been filtered and sterilized;

a recirculating arrangement connected to said sterilization unit for recirculating said treated water through said sterilization unit;

a water temperature sensor for detecting, as a detected water temperature, a temperature of one of said raw water, said filtered water, and said treated water; and lamp control means connected to said ultraviolet radiation lamps and said water temperature sensor and responsive to said detected water temperature for controllably changing the number of selected ones of said ultraviolet radiation lamps to be activated upon recirculation of said treated water.

* * * * *